US011167358B2

(12) United States Patent
Slack et al.

(10) Patent No.: US 11,167,358 B2
(45) Date of Patent: Nov. 9, 2021

(54) APPARATUS AND METHODS FOR IMPROVING CONTACT STRESS DISTRIBUTION WITHIN COLLET-TYPE MECHANISMS

(71) Applicant: NOETIC TECHNOLOGIES INC., Edmonton (CA)

(72) Inventors: Maurice William Slack, Edmonton (CA); Victor Yung, Edmonton (CA)

(73) Assignee: Noetic Technologies Inc., Edmonton (CA)

( * ) Notice: Subject to any disclaimer, the term of this patent is extended or adjusted under 35 U.S.C. 154(b) by 0 days.

(21) Appl. No.: 16/964,977

(22) PCT Filed: Mar. 6, 2020

(86) PCT No.: PCT/CA2020/000021
§ 371 (c)(1),
(2) Date: Jul. 25, 2020

(87) PCT Pub. No.: WO2020/176967
PCT Pub. Date: Sep. 10, 2020

(65) Prior Publication Data
US 2021/0008640 A1 Jan. 14, 2021

Related U.S. Application Data

(60) Provisional application No. 62/814,797, filed on Mar. 6, 2019.

(51) Int. Cl.
*B23B 31/20* (2006.01)
*B23B 31/40* (2006.01)

(52) U.S. Cl.
CPC ........ *B23B 31/202* (2013.01); *B23B 31/4013* (2013.01); *B23B 2215/72* (2013.01);
(Continued)

(58) Field of Classification Search
CPC .......... B23B 31/202; B23B 2231/2013; B23B 2231/2021; B23B 31/4013
See application file for complete search history.

(56) References Cited

U.S. PATENT DOCUMENTS

| 990,087 | A | * | 4/1911 | Whitehead | ............ B23B 31/202 279/49 |
| 1,917,752 | A | * | 7/1933 | Connell | ................. B23B 31/202 279/53 |

(Continued)

FOREIGN PATENT DOCUMENTS

| CN | 2512800 A1 | 9/2001 |
| WO | 2010006441 A1 | 1/2010 |

OTHER PUBLICATIONS

International Search Report re PCT/CA2020/000021, issued by the ISA/CA dated Jun. 2, 2020.

(Continued)

*Primary Examiner* — Eric A. Gates
(74) *Attorney, Agent, or Firm* — Donald V. Tomkins

(57) ABSTRACT

A collet-type mechanism for releasably gripping either an external or internal target surface of a tubular workpiece includes a collet receiver defining a collet receiver contact surface configured as a curved lateral surface of a truncated right circular cone, and a segmented collet assembly comprising a plurality of collet segments. Each collet segment defines a workpiece engagement surface configured for gripping engagement with a workpiece target surface, and a collet segment contact surface configured for at least partial contacting engagement with the collet receiver contact surface. The collet segment contact surface may comprise two axially-contiguous regions, one of which corresponds to a curved lateral surface of either an oblique circular cylinder or a right circular cylinder, and the other of which corre-
(Continued)

sponds to a curved lateral surface of a truncated right circular cone.

13 Claims, 12 Drawing Sheets

(52) U.S. Cl.
CPC ............... *B23B 2231/2013* (2013.01); *B23B 2231/2021* (2013.01); *B23B 2265/34* (2013.01)

(56) References Cited

U.S. PATENT DOCUMENTS

| | | | | |
|---|---|---|---|---|
| 2,282,676 A | * | 5/1942 | Pigott | B23B 31/202 279/51 |
| 2,615,721 A | * | 10/1952 | Gridley | B23B 31/1207 279/60 |
| 2,755,094 A | * | 7/1956 | Benjamin | B23B 31/202 279/51 |
| 2,829,899 A | * | 4/1958 | Cochran | B23B 31/4013 279/2.02 |
| 3,380,097 A | * | 4/1968 | Pharris | B05C 17/0205 15/145 |
| 3,669,462 A | * | 6/1972 | Parsons | B23B 31/202 279/51 |
| 4,509,765 A | * | 4/1985 | Nowak | B23B 31/207 279/146 |
| 5,896,787 A | * | 4/1999 | DeVincentis | G02B 6/245 81/9.51 |
| 6,213,478 B1 | * | 4/2001 | Nishikawa | C23C 16/4584 118/500 |
| 7,789,602 B2 | * | 9/2010 | Duesing | B23B 31/207 409/233 |
| 7,909,120 B2 | | 3/2011 | Slack | |
| 10,081,989 B2 | | 9/2018 | Slack | |
| 10,272,500 B2 | * | 4/2019 | Miura | B23B 31/202 |
| 2006/0226651 A1 | * | 10/2006 | Griswold | F16L 37/0925 285/322 |

OTHER PUBLICATIONS

Written Opinion of the International Searching Authority re PCT/CA2020/000021, issued by the ISA/CA dated Jun. 2, 2020.

* cited by examiner

APPARATUS AND METHODS FOR IMPROVING CONTACT STRESS DISTRIBUTION WITHIN COLLET-TYPE MECHANISMS

FIELD

This disclosure relates in general to collet-type and slips-type devices and mechanisms for releasably gripping an object or workpiece such that displacement of the workpiece relative to the collet is strongly resisted when axial load is transferred in one direction between the collet and its receiving sleeve, and the collet is urged to release the workpiece when the direction of axial load is reversed.

BACKGROUND

Collet-type mechanisms have been used in a wide variety of devices and mechanisms for well over one hundred years. Examples of collet-type mechanisms can be found in many devices, including but not limited to:

Chucks on milling machines used to hold tooling;
Chucks on multi-bit screwdrivers used to hold bits;
Chucks on telescoping leg assemblies used to lock the positions of concentric leg segments relative to each other;
Slips on drilling rigs used to hold pipe strings; and
Tubular running tools, such as tools described in U.S. Pat. No. 7,909,120 (Slack) and U.S. Pat. No. 10,081,989 (Slack).

Collet-type mechanisms offer numerous advantages including the following:

Self-centering of the workpiece relative to the collet mechanism;
Precise centering of the workpiece relative to the collet mechanism;
Strong gripping of the workpiece;
Resistance to the workpiece being jarred loose (i.e., untightened); and
Ability to quickly release and change the workpiece being gripped.

Collet-type mechanisms that grip an external surface of a workpiece are generally known as external collets. Collet-type mechanisms that grip an internal surface of a workpiece are generally known as internal collets.

Conventional collet-type mechanisms typically incorporate two contacting components: a segmented collet assembly (alternatively referred to herein simply as a "segmented collet"), and a collet receiver. The surface of the collet receiver that contacts the segmented collet is configured as a curved lateral surface of a truncated right circular cone. The surfaces of the segmented collet (i.e., surfaces of the collet segments) that contact the collet receiver are also configured as curved lateral surfaces of a truncated right circular cone. The segments of the segmented collet function as wedges acting between the collet receiver and the workpiece.

Application of axial load to the segmented collet in one direction relative to the collet receiver will increase the gripping force acting on the workpiece. Application of axial load to the segmented collet in the opposite direction will urge the collet mechanism to release the workpiece. Axial load may be applied to the segmented collet via the workpiece, as is done with common drilling rig slips (in which case the workpiece is a length of pipe). Alternatively, the axial load may be primarily applied to the segmented collet by means independent of the workpiece, as with common chucks on milling machines.

As used in this disclosure, the term "collet segment" is to be understood as meaning a segment of a segmented collet. The collet segments in a given segmented collet may be physically separate from each other, or may be coupled by some means permitting a selected degree of relative movement between the collet segments in one or more directions or senses. Non-limiting examples of means for permitting relative movement between coupled collet segments include the provision of an integrated metal spring, and forming the collet using two or more materials having different flexural stiffnesses.

When a collet-type mechanism is used to grip a workpiece that dimensionally corresponds to the "nominal" size of the collet-type mechanism (typically corresponding to a "nominal" internal or external diameter), the collet segments will contact the collet receiver and initiate gripping of the workpiece when the segmented collet is located at a "nominal" axial reference position along the length of the collet receiver. At this nominal reference position, the contacting surfaces of the collet segments and the collet receiver will have the same radius at each axial location along the lengths of the components, and the contacting surfaces will thus coincide. As axial force is applied to the segmented collet to increase the gripping force, the contact stress distribution that develops between the collet segments and collet receiver will be nearly uniform. For purposes of this disclosure, this type of contact condition will be referred to as "match contact" (as further discussed later herein with reference to FIGS. 1A and 2A).

When a collet-type mechanism holds a workpiece that is not of the nominal size, the collet segments will contact the collet receiver and initiate gripping of the workpiece when the segmented collet is located at an axial position within the collet receiver that is away from the nominal axial reference position. At every axial location, the radii of curvature of the contact surfaces of the collet segments and the collet receiver will be different. As axial force is applied to the segmented collet to increase the gripping force, the contact stress distribution that develops between the collet segments and the collet receiver will be less uniform than for the situation where the workpiece is of the nominal size.

With an internal collet mechanism, if the size of the workpiece is less than the nominal size of the collet, the area of contact of each collet segment with the collet receiver will be reduced toward the longitudinal center of each collet segment. For purposes of this disclosure, this type of contact condition will be referred to as "center contact" (as further discussed later herein with reference to FIG. 2B).

If the size of the workpiece is greater than the nominal size of the collet, then the area of contact of each collet segment with the collet receiver will be reduced toward the two longitudinal edges of each collet segment. For purposes of this disclosure, this type of contact condition will be referred to as "edge contact" (as further discussed later herein with reference to FIGS. 1C and 2C).

With an external collet mechanism, if the size of the workpiece is less than the nominal size of the collet, then edge contact occurs (as in FIG. 1C). If the size of the workpiece is greater than the nominal size of the collet, then center contact occurs (as in FIG. 1B).

The reduction of contact area when the workpiece varies from the nominal size of the collet, as described above, leads to an increase in the maximum contact stress for a given gripping force. This increase in maximum contact stress is more pronounced with a given axial positional change from match contact toward an edge contact condition, compared to an axial positional change of the same magnitude toward a center contact condition. Sliding occurs between the contact surfaces as the gripping force increases, or as the workpiece is released, or if the collet mechanism permits relative rotation (such as in tubular running tools described in U.S. Pat. No. 7,909,120). The risk of the contact surfaces galling or being otherwise damaged increases as the maximum contact stress increases. For this reason, the acceptable size range of workpieces specified for some collet mechanisms may be selected to produce either match contact or center contact, and to avoid edge contact.

If torque is transmitted between the collet receiver and workpiece through the collet mechanism, each collet segment will have a greater tendency to rotate along an axis generally parallel to the longitudinal axis of the collet mechanism when in a center contact condition, as compared to the tendency for such rotation when the collet segment is in a match contact condition or edge contact condition. Such rotation of the collet segments may cause the collet mechanism to jam and impair the collet mechanism's ability to quickly release the workpiece. Therefore, the collet segments are described as having less stability when in a center contact condition than when in a match contact condition or an edge contact condition.

BRIEF SUMMARY

In general terms, the present disclosure teaches embodiments of collet-type mechanisms in which the contact conditions between the collet segments and the collet receiver are less dependent on the size of the workpiece gripped by the mechanism than in prior art collet-type mechanisms that have conical contact surfaces on both the collet segments and the collet receiver. The present disclosure also teaches embodiments of methods for selecting the configuration of the surface of a collet segment that contacts the collet receiver.

More specifically, the present disclosure teaches collet-type mechanisms in which the surface of the collet receiver that contacts the collet segments is configured as a curved lateral surface of a truncated right circular cone, and the surface of each collet segment that contacts the collet receiver (which surface is also referred herein as a "collet segment contact surface") is configured to have curvature which, as viewed in section transversely perpendicular to the longitudinal axis of the mechanism, is invariant along at least part of the axial length of the collet segment. In the most general form, each collet segment contact surface is configured as an arc having a curvature similar to the curvature of the conical collet receiver surface, and projected for at least part of its length along a line parallel to the taper of the conical collet receiver surface.

Embodiments within the scope of the present disclosure include collet segments wherein the surface that contacts the collet receiver is at least partly configured as a curved lateral surface of a circular cylinder, wherein the circular cylinder may be an oblique circular cylinder in some embodiments and a right circular cylinder in other embodiments. As used in this disclosure:

the term "oblique circular cylinder" (or "OCC") is to be understood as meaning a cylinder having two planar circular bases of equal diameter that are parallel to each other, and an "OCC" axis extending between the centers of the bases where the OCC axis is not perpendicular to the bases;

the term "right circular cylinder" (or "RCC") is to be understood as meaning a cylinder having two planar circular bases of equal diameter that are parallel to each other, and an "RCC" axis extending between the centers of the bases where the RCC axis is perpendicular to the bases; and the term "cylindrical surface" is to be understood as meaning a curved lateral surface of an oblique or right circular cylinder that does not include a surface of either of the bases of the cylinder.

The skew angle of a circular cylinder is to be understood as meaning the angle between the OCC or RCC axis (as the case may be) and normal vectors extending from the centers of the bases. For a right circular cylinder (RCC), the skew angle is zero. For an oblique circular cylinder (OCC), the skew angle is non-zero.

The term "collet receiver contact surface" is to be understood as meaning the surface of the collet receiver that contacts the collet segments.

For both external and internal collet mechanisms, the angle between the axis of the cylindrical surface of each collet segment and the axis of the conical collet receiver contact surface may be selected to equal the taper angle of the conical collet receiver contact surface.

The radii of the cylindrical surfaces of the collet segments may be selected to optimize the contact stress distribution based on the design objectives for the collet mechanism. For an external collet mechanism, the radius of the cylindrical surface on each collet segment may be selected to be close fitting with the smallest radius of the conical collet receiver contact surface. For an internal collet mechanism, the radius of the cylindrical surface on each collet segment may be selected to be close fitting with the largest radius of the conical collet receiver contact surface.

The skew angle of the circular cylinders defining a portion of the contact surface of each collet segment also may be selected to optimize the contact stress distribution based on the particular design objectives for the collet-type mechanism. In one embodiment in accordance with the present disclosure, the skew angle is selected to equal the taper angle of the conical collet receiver contact surface, and the resulting portion of the contact surface on each collet segment is a part of an oblique cylindrical surface. In another embodiment, the skew angle is selected to be less than the taper angle of the conical collet receiver contact surface—for example, with the skew angle equal to zero and the resulting portion of the contact surface of each collet segment being part of a right cylindrical surface. In a further embodiment, the skew angle is selected to be greater than the taper angle of the conical collet receiver contact surface.

As further explanation, the contact stress distribution may be optimized by selection of the skew angle and radius of the cylindrical surface on collet segments that contact the collet receiver in accordance with the following principles:

For an internal collet:
  decreasing the skew angle or radius will bias the contact condition between collet segments and collet receiver in the direction away from center contact and toward edge contact; and
  increasing the skew angle or radius will bias the contact conditions between collet segments and collet receiver in the direction away from edge contact and toward center contact.

For an external collet:
  decreasing the skew angle or radius will bias the contact condition between collet segments and collet receiver in the direction away from edge contact and toward center contact; and increasing the skew angle or radius will bias the contact conditions between collet segments and collet receiver in the direction away from center contact and toward edge contact.

It will be apparent to persons skilled in the art that when the skew angle of the cylindrical surface of each collet segment is selected to equal the taper angle of the conical contact surface of the collet receiver, match contact will occur at the axial location where the radius of the collet receiver equals the radius selected for the contacting cylindrical surface of the collet segment (for example, at the smallest cone radius for an external collet mechanism, and at the largest cone radius for an internal collet mechanism), independent of the workpiece size.

Using an internal collet as an example for purposes of further explanation, when the skew angle is selected to be less than the taper angle, contact between a collet segment and the collet receiver will tend in the direction toward edge contact. However, unlike the edge contact occurring in prior art internal collets that have conical contact surfaces on the collet segments and on the collet receiver, the degree of bias toward edge contact is independent of the workpiece size, and is controlled by the selection of the skew angle and radius of the cylindrical surface of the collet segment that contacts the collet receiver.

When the skew angle is selected to be greater than the taper angle, contact between a collet segment and the collet receiver will tend toward center contact. However, unlike the center contact occurring in prior art collets that have conical contact surfaces on both the segmented collet and the collet receiver, the degree of bias toward center contact is independent of the workpiece size and is controlled by the selection of the skew angle and radius of the cylindrical surface of the collet segment that contacts the collet receiver.

Collet-type mechanisms in accordance with the present disclosure may thus be designed such that the contact stress distribution between the segmented collet and the collet receiver is less dependent upon variations in workpiece size compared to otherwise-similar prior art collet mechanisms that have conical contact surfaces on the collet segments as well as on the collet receiver. Because the cylindrical surfaces of the collet segments have a constant radius along their length, and the conical collet receiver contact surface has a varying radius along its length, the contact condition varies along the axial length of the collet while also being independent of workpiece size. Thus, the collet segments can be designed to have greater stability when transferring torque between the collet mechanism and the workpiece for workpiece sizes that would otherwise result in a center contact condition with prior art collet mechanisms.

This increased stability results from the provision of a larger contact width in the transverse direction. The same collet segments also can provide lower contact stress for workpiece sizes that would otherwise result in an edge contact condition with prior art collets. This lower contact stress results from the reduction and/or elimination of edge contact and provision of a larger contact area. There is also an associated increase in center contact, which provides gradually converging contact surfaces that can enhance lubrication for collet-type mechanisms that permit relative rotation (such as, for example, in tubular running tools of the type described in U.S. Pat. No. 7,909,120).

In general terms, therefore, the present disclosure teaches a collet-type mechanism comprising a collet receiver defining a collet receiver contact surface configured as a curved lateral surface of a truncated right circular cone, and a segmented collet assembly comprising a plurality of collet segments. Each collet segment defines:

a workpiece engagement surface configured for radially-compressive engagement with a workpiece to be gripped by the collet-type mechanism; and a collet segment contact surface configured for at least partial contacting engagement with the collet receiver contact surface, wherein the curvature of said collet segment contact surface, as viewed in section transversely perpendicular to a longitudinal axis of the collet mechanism, is invariant along at least part of the axial length of the collet segment.

In some embodiments, each collet segment contact surface is at least partly configured as a portion of a curved lateral surface of a circular cylinder, which may be either an oblique circular cylinder or a right circular cylinder.

In other embodiments, each collet segment contact surface comprises axially-contiguous first and second surface regions, with the first surface region being at least partly configured as a portion of a curved lateral surface of either an oblique circular cylinder or a right circular cylinder; and with the second surface region being at least partly configured as a portion of a curved lateral surface of a truncated right circular cone.

Collet-type mechanisms in accordance with the present disclosure may be configured as "internal" collet mechanisms for gripping an internal cylindrical surface of a workpiece, or as "external" collet mechanisms for gripping an external cylindrical surface of a workpiece. Accordingly, collet-type mechanisms in accordance with the present disclosure can be incorporated in an internally-gripping tubular running tools such as:

an internally-gripping tubular running tool comprising:
an elongate mandrel defining an outer mandrel surface configured to define a plurality of mandrel contact surfaces corresponding to curved surfaces of a truncated circular cone (such that the mandrel effectively acts as a collet receiver in accordance with the present teachings); and
a plurality of slips elements each having:
an outer workpiece engagement surface configured for gripping engagement with an internal surface of a tubular workpiece; and
a plurality of inner surface regions each configured for contacting engagement with a corresponding one of the mandrel contact surfaces, with at least part of each inner surface region being configured to correspond to a curved surface of a circular cylinder, which may be either an oblique circular cylinder or a right circular cylinder (such that the slips effectively act as a collet segments in accordance with the present teachings).

and:

an externally-gripping tubular running tool comprising:
an elongate, generally cylindrical mandrel having in inner bore defining a plurality of mandrel contact surfaces configured to correspond to curved surfaces of a truncated circular cone (such that the mandrel effectively acts as a collet receiver in accordance with the present teachings); and
a plurality of slips assemblies each including a die and a jaw, wherein:
each die defines an inner workpiece engagement surface configured for gripping engagement with an external surface of a tubular workpiece; and each jaw defines an outer contact surface region configured for contacting engagement with a corresponding one of the mandrel contact surfaces, with at least part of each outer surface region being configured to correspond to a curved surface of a circular cylinder, which may be either an oblique circular cylinder or a right circular cylinder (such that the slips effectively act as a collet segments in accordance with the present teachings).

BRIEF DESCRIPTION OF THE DRAWINGS

Embodiments in accordance with this disclosure will now be described with reference to the accompanying Figures, in which numerical references denote like parts, and in which.

DETAILED DESCRIPTION

Collet Contact Geometries and Contact Stresses—Overview

The contact geometry and contact stresses between collet segments and a collet receiver may be theoretically predicted using analytical equations for contact mechanics found in published texts such as:

Budynas, Richard G. and Nisbett, J. Keith, *Shigley's Mechanical Engineering Design*, $10^{th}$ ed. (New York: McGraw-Hill Education, 2014); and Boresi, Arthur P. and Sidebottom, Omar M., *Advanced Mechanics of Materials*, $4^{th}$ ed. (New York: John Wiley & Sons, 1985).

Finite element analysis software tools may also be used to predict the contact geometry and contact stresses, and may provide more accurate predictions than analytical equations for some collet-type mechanisms.

Figure 1A:
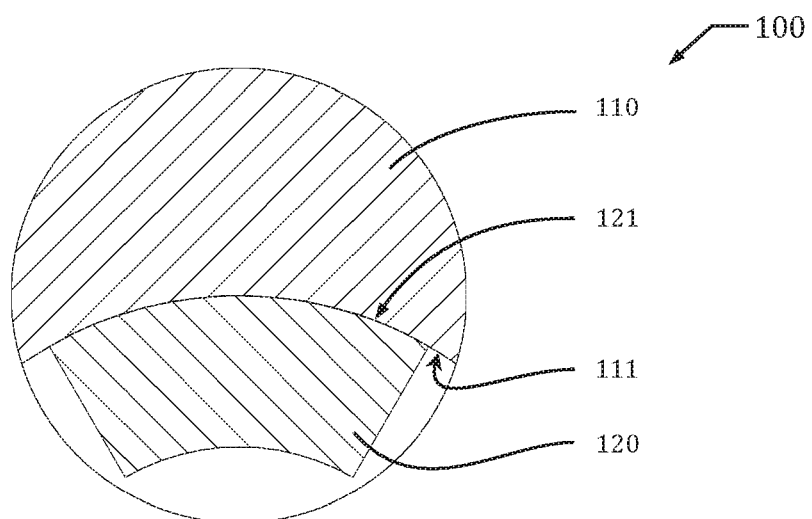
FIG. 1A is a detail view of a transverse section through an external collet comprising a collet receiver and a segmented collet, illustrating a "match contact" condition between the collet receiver and one segment of the segmented collet.

FIG. 1A is a transverse section through an external collet mechanism 100 comprising a collet receiver 110 having an inside surface 111, and a segmented collet comprising a plurality of collet segments 120, each having an outside surface 121. FIG. 1A illustrates a match contact condition between the collet receiver 110 and one of the collet segments 120. In a match contact condition for an external collet as in FIG. 1A, the outside surface 121 of collet segment 120 has the same radius of curvature as the inside surface 111 of collet receiver 110.

Figure 1B:
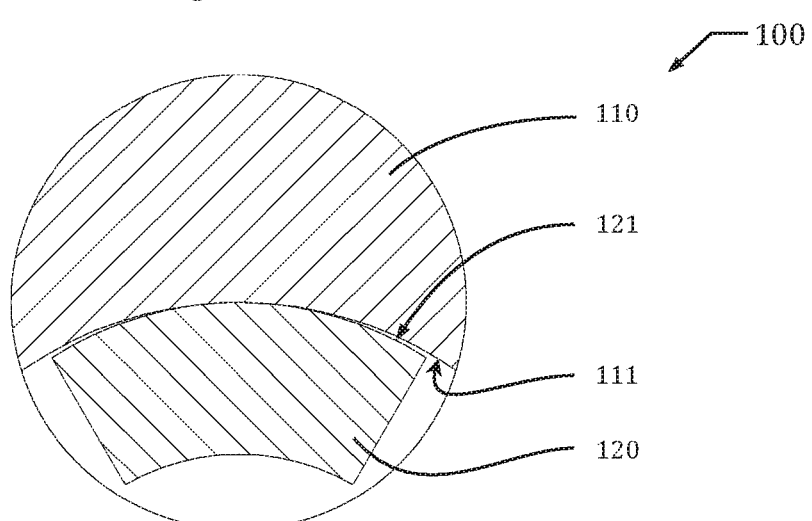
FIG. 1B is a detail view of a transverse section through an external collet similar to FIG. 1A, but illustrating a "center contact" condition between the collet receiver and the collet segment.

FIG. 1B is similar to FIG. 1A but that it illustrates a center contact condition between collet receiver 110 and collet segment 120. In a center contact condition for an external collet as in FIG. 1B, outside surface 121 of collet segment 120 has a smaller radius of curvature than inside surface 111 of collet receiver 110.

Figure 1C:
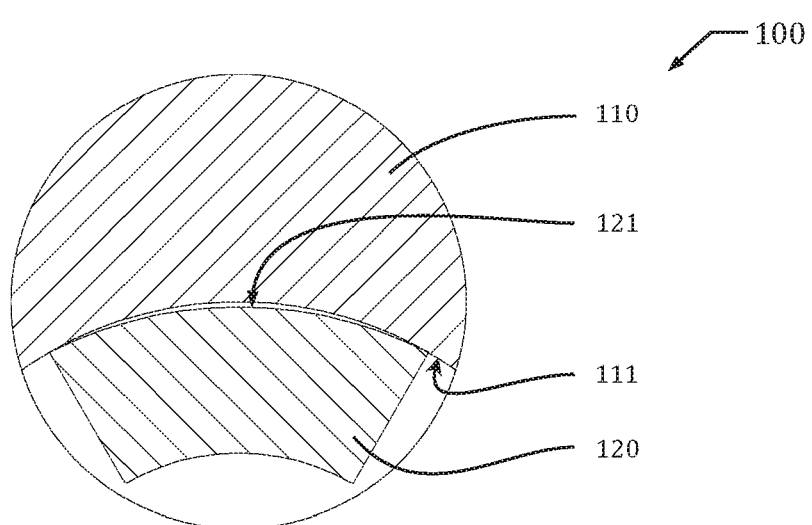
FIG. 1C is a detail view of a transverse section through an external collet similar to FIG. 1A, but illustrating an "edge contact" condition between the collet receiver and the collet segment.

FIG. 1C is similar to FIG. 1A but illustrates an edge contact condition between collet receiver 110 and collet segment 120. In an edge contact condition for an external collet as in FIG. 1C, outside surface 121 of collet segment 120 has a larger radius of curvature than inside surface 111 of collet receiver 110.

Figure 2A:
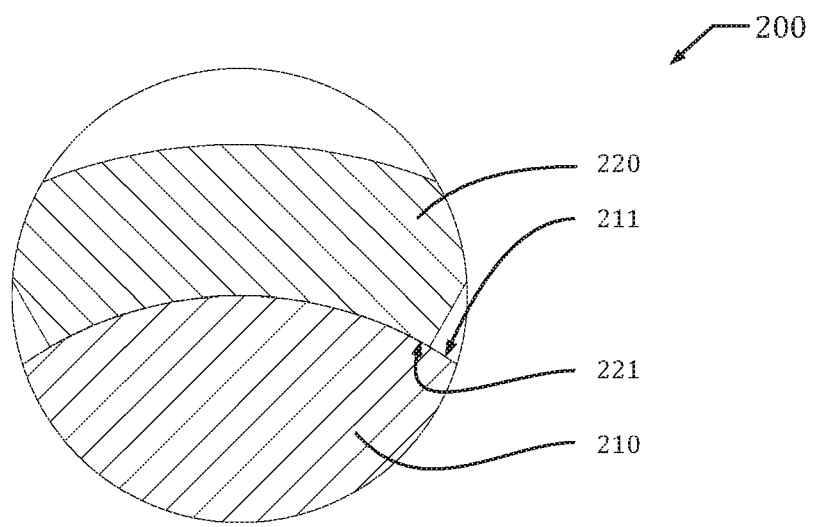
FIG. 2A is a detail view of a transverse section through an internal collet comprising a collet receiver and a segmented collet, illustrating a "match contact" condition between the collet receiver and one segment of the segmented collet.

FIG. 2A is a transverse section through an internal collet mechanism 200 comprising a collet receiver 210 having an inside surface 211, and a segmented collet comprising a plurality of collet segments 220, each having an outside surface 221. FIG. 1A illustrates a match contact condition between the collet receiver 210 and one of the collet segments 220. In a match contact condition for an internal collet as in FIG. 2A, the inside surface 221 of collet segment 220 has the same radius of curvature as the outside surface 211 of collet receiver 210.

Figure 2B:
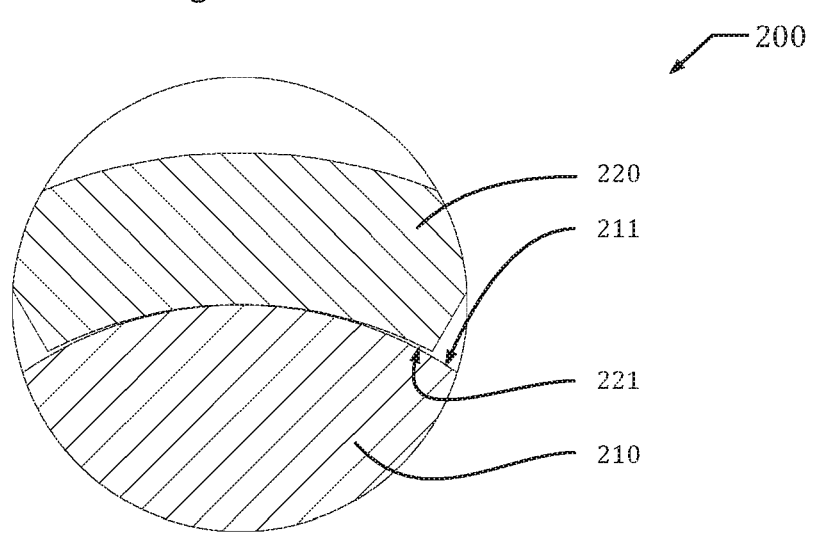
FIG. 2B is a detail view of a transverse section through an internal collet similar to FIG. 2A, but illustrating a "center contact" condition between the collet receiver and the collet segment.

FIG. 2B is similar to FIG. 2A but illustrates a center contact condition between collet receiver 210 and collet segment 220. In a center contact condition for an internal collet as in FIG. 2B, inside surface 221 of collet segment 220 has a larger radius of curvature than outside surface 211 of collet receiver 210.

Figure 2C:
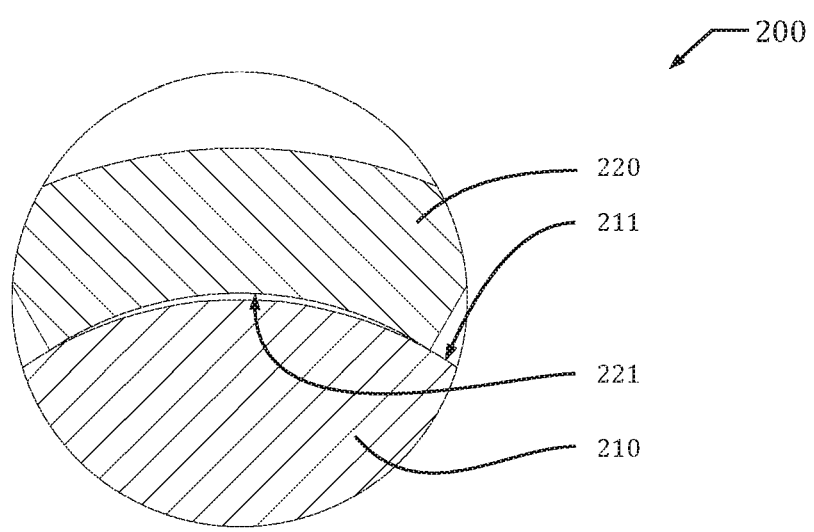
FIG. 2C is a detail view of a transverse section through an internal collet similar to FIG. 2A, but illustrating an "edge contact" condition between the collet receiver and the collet segment.

FIG. 2C is similar to FIG. 2A but illustrates an edge contact condition between collet receiver 210 and collet segment 220. In an edge contact condition for an internal collet as in FIG. 2C, inside surface 221 of collet segment 220 has a smaller radius of curvature than outside surface 211 of collet receiver 210.

Embodiment #1—External Collet Mechanism

Figure 3A:
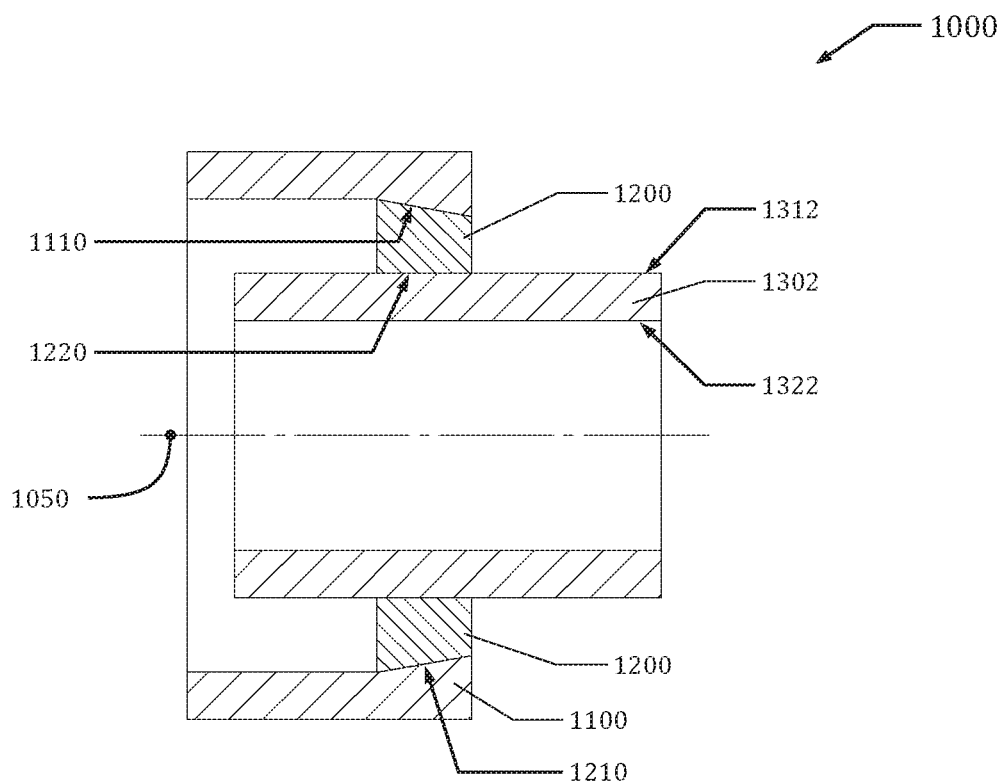
FIG. 3A is a longitudinal section through a first embodiment of an external collet in accordance with the present disclosure, showing the external collet engaging a workpiece having the maximum external diameter that the external collet is designed to grip.
Figure 4A:
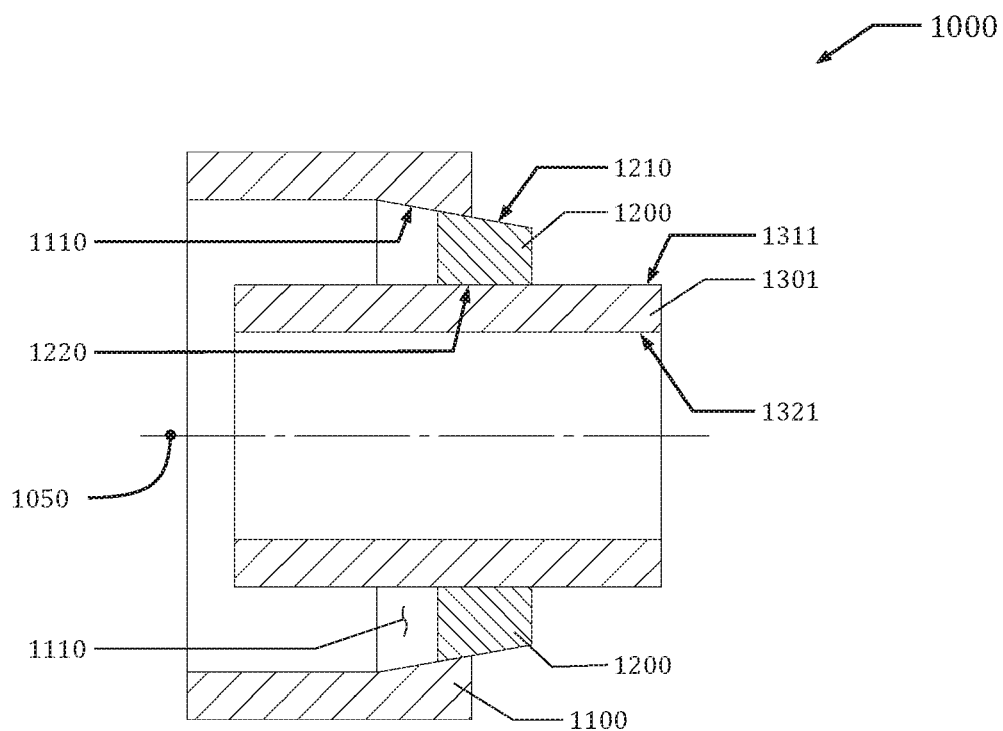
FIG. 4A is a longitudinal section through the external collet in FIG. 3A, showing the collet engaging a workpiece having the minimum external diameter that the external collet is designed to grip.

FIGS. 3A and 4A are longitudinal sections through an embodiment 1000 of an external collet mechanism in accordance with the present disclosure. External collet 1000 has a longitudinal axis 1050, and comprises a collet receiver 1100 and a segmented collet comprising a plurality of collet segments 1200. Collet receiver 1100 has a bore defining a collet receiver contact surface 1110 configured as a curved lateral surface of a truncated right circular cone.

Each collet segment 1200 has a radially-external collet segment contact surface 1210 comprising a first surface region 1211 and a second surface region 1212, with second surface region 1212 being axially contiguous with first surface region 1211. First and second surface regions 1211 and 1212 are configured for contact with collet receiver contact surface 1110, as described in greater detail later herein. Each collet segment 1200 further has radially-internal workpiece engagement surface 1220 suitably configured for gripping an outer surface of a tubular workpiece.

In FIG. 3A, external collet 1000 is shown with workpiece engagement surfaces 1220 of collet segments 1200 in gripping engagement with an external surface 1312 of a workpiece 1302 having an external diameter corresponding to the maximum external diameter that collet 1000 is designed to grip. For purposes of this disclosure, the position in which collet segments 1200 are shown in FIG. 3A—i.e., in which the axial length of the contact region between collet segment contact surfaces 1210 and collet receiver contact surface 1110 is greatest—is referred to as the retracted position.

Figure 3B:
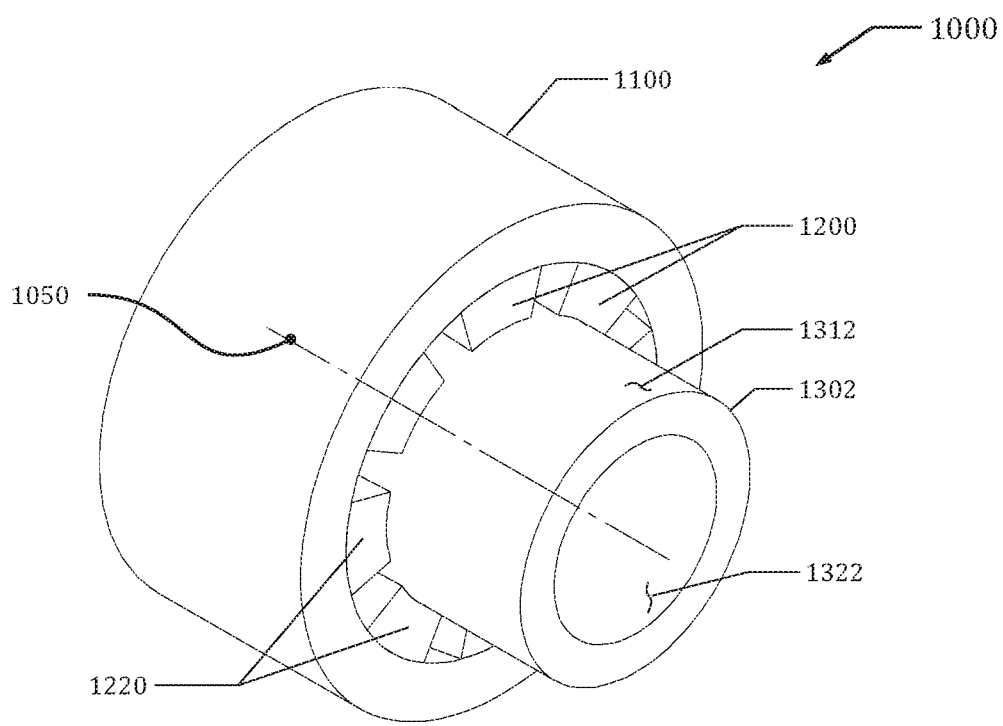
FIG. 3B is an isometric view of the collet and workpiece in FIG. 3A.

FIG. 3B is an isometric view of external collet 1000 grippingly engaging workpiece 1302 as in FIG. 3A.

In FIG. 4A, external collet 1000 is shown with workpiece engagement surfaces 1220 of collet segments 1200 in gripping engagement with an external surface 1311 of a workpiece 1301 having an external diameter corresponding to the minimum external diameter that collet 1000 is designed to grip. For purposes of this disclosure, the position in which collet segments 1200 are shown in FIG. 4A—i.e., in which the axial length of the contact region between collet segment contact surfaces 1210 and collet receiver contact surface 1110 is least—is referred to as the extended position.

Figure 4B:
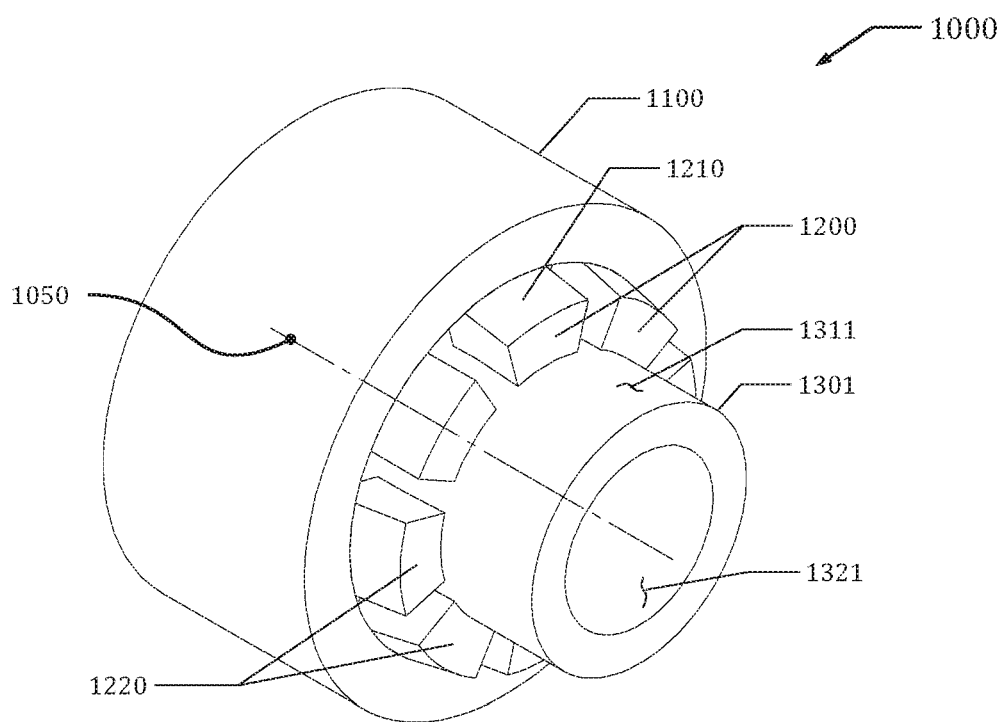
FIG. 4B is an isometric view of the external collet and workpiece in FIG. 4A.

FIG. 4B is an isometric view of external collet 1000 grippingly engaging workpiece 1301 as in FIG. 4A.

Figure 5A:
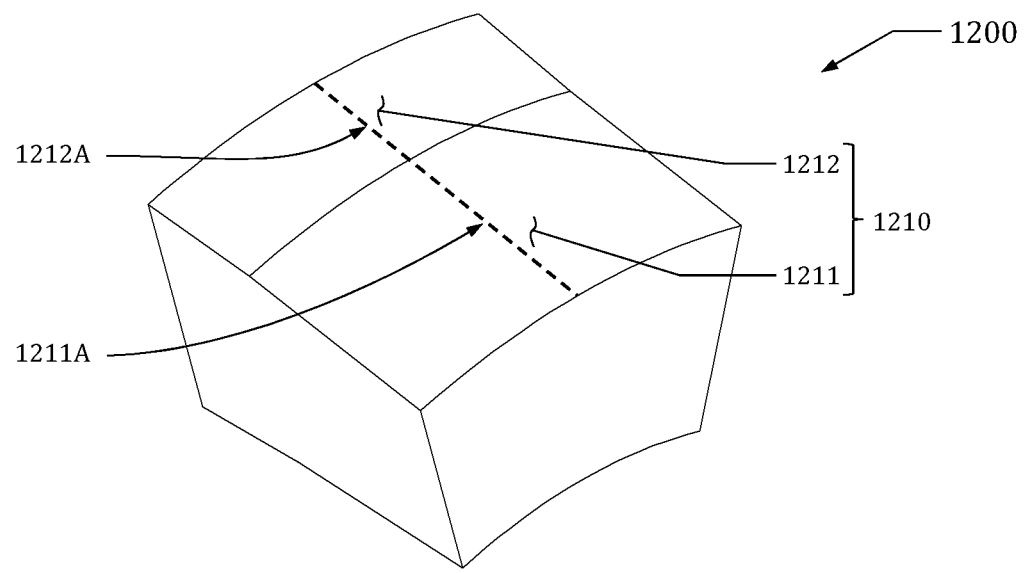
FIG. 5A is an isometric view of a collet segment of the external collet shown in FIG. 3A.
Figure 5B:
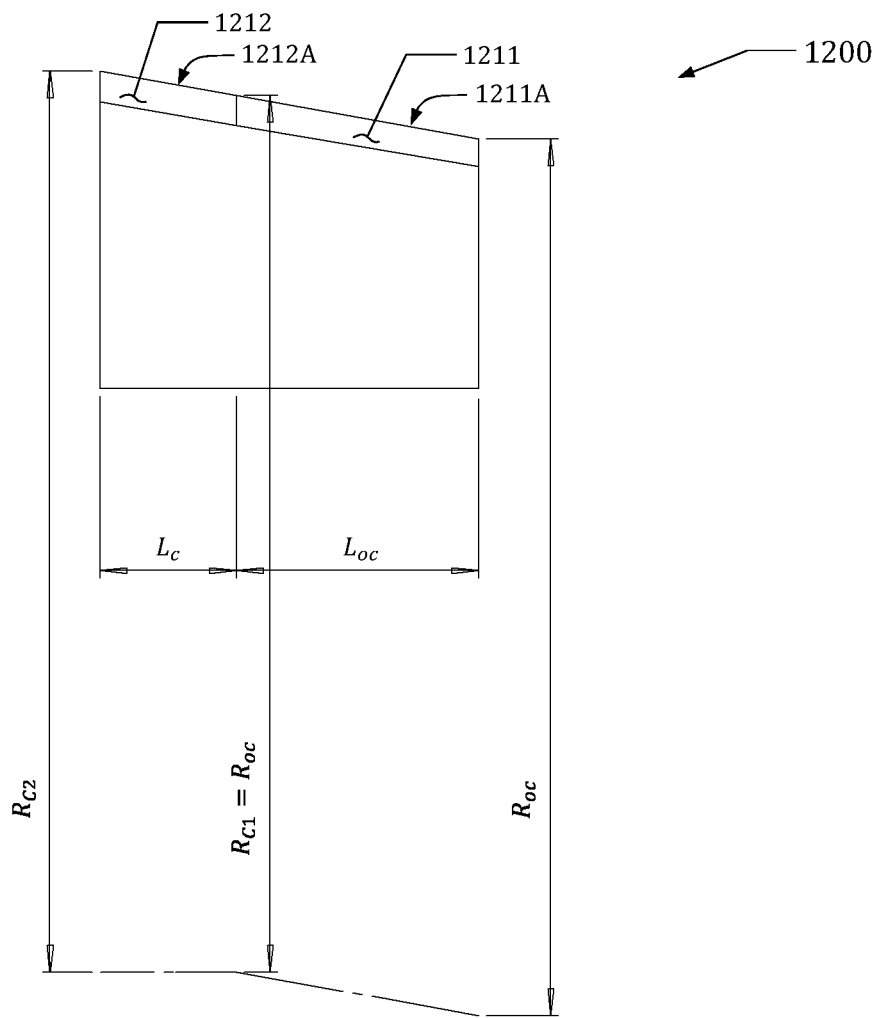
FIG. 5B is a longitudinal elevation of the collet segment shown in FIG. 5A.

FIGS. 5A and 5B further illustrate a typical collet segment 1200 of external collet 1000. As previously noted, each collet segment 1200 has a collet segment contact surface 1210 comprising first and second surface regions 1211 and 1212. First surface region 1211 has an axial length $L_{OC}$ and is configured as a portion of a curved lateral surface of an OCC. Second surface region 1212 has an axial length $L_C$ and is configured as a portion of a curved lateral surface of a truncated right circular cone. Reference numbers 1211A and 1212A in FIGS. 5A and 5B indicate surficial lines that are coincident with, and which longitudinally bisect, first and second surface regions 1211 and 1212, respectively. As most clearly seen in FIG. 5A, surficial lines 1211A and 1212A in the illustrated embodiment are collinear (i.e., all points on lines 1211A and 1212A lie on the same straight line), and are parallel to the taper angle of conical collet receiver contact surface 1110 radially adjacent to second surficial line 1212A.

The axial length $L_C$ and radii $R_{C1}$ and $R_{C2}$ of second surface region 1212 may be selected such that the configuration of second surface region 1212 matches the configuration of collet receiver contact surface 1110 when collet segments 1200 are in their extended position. Thus selected, the taper angle of second surface region 1212 will be equal to the taper angle of collet receiver contact surface 1110.

Radius $R_{OC}$ of first surface region 1211 may be equal to radius $R_{C1}$ of second surface region 1212. The skew angle of the OCC that is used to define first surface region 1211 may be selected to be equal to the taper angle of the truncated right circular cone that is used to define collet receiver contact surface 1110.

Embodiment #2—Internal Collet Mechanism

Figure 6A:
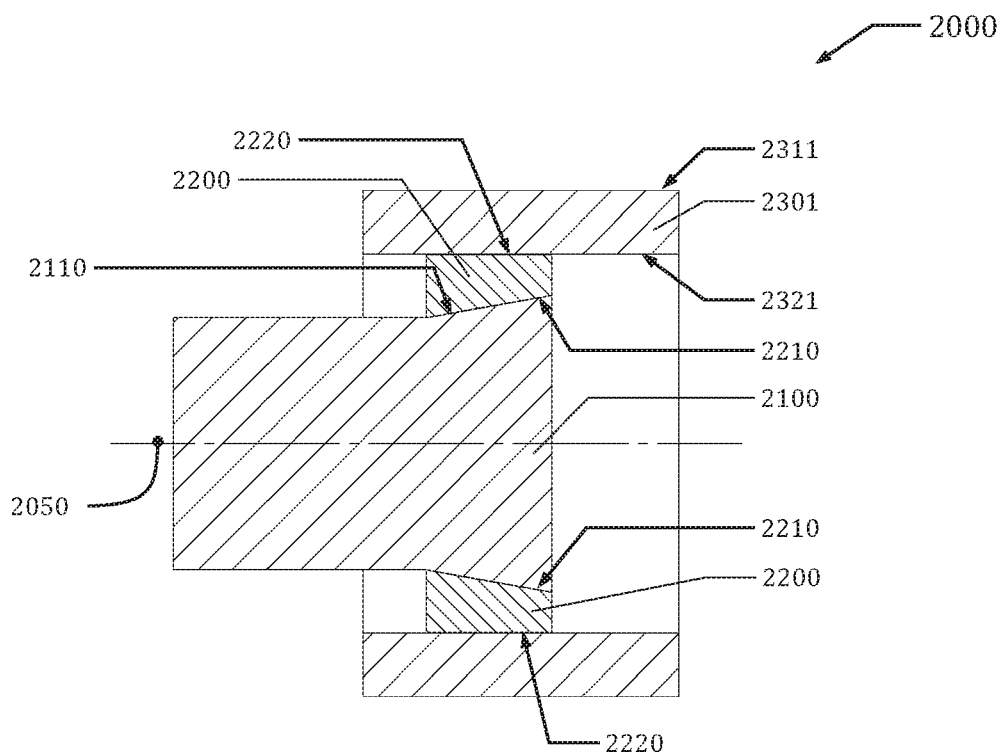
FIG. 6A is a longitudinal section through a first embodiment of an internal collet in accordance with the present disclosure, showing the internal collet engaging a workpiece having the minimum internal diameter that the internal collet is designed to grip.
Figure 7A:
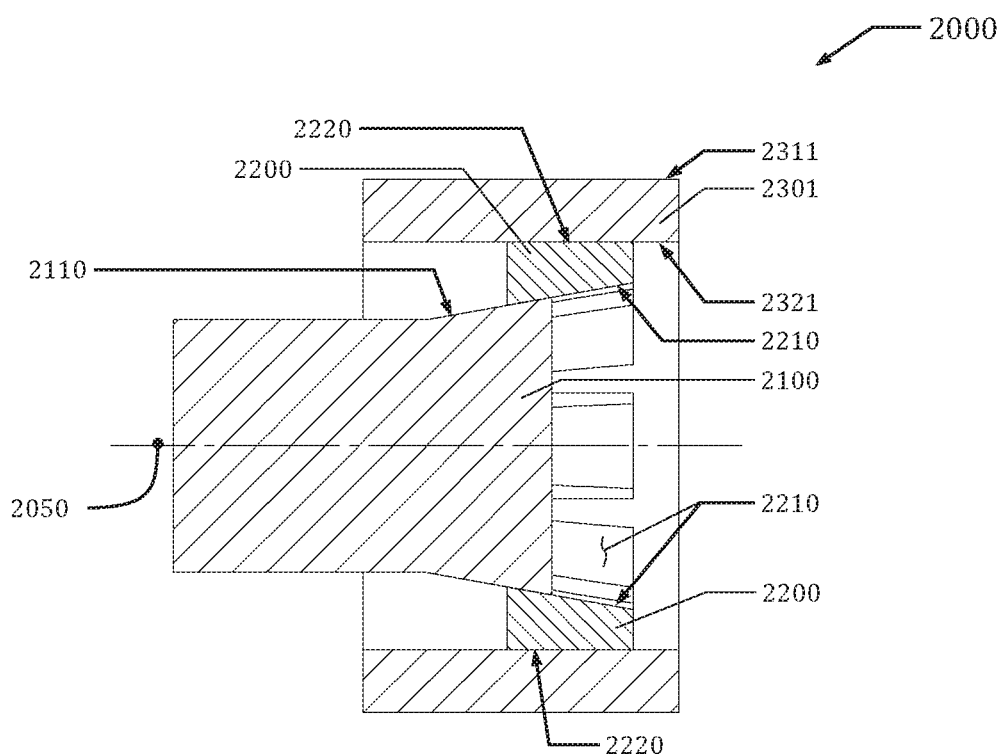
FIG. 7A is a longitudinal section through the internal collet in FIG. 6A, showing the collet engaging a workpiece having the maximum internal diameter that the internal collet is designed to grip.

FIGS. 6A and 7A are longitudinal sections through an embodiment 2000 of an internal collet mechanism constructed in accordance with the present disclosure. Internal collet 2000 has a longitudinal axis 2050, and comprises a collet receiver 2100 and a segmented collet comprising a plurality of collet segments 2200. Collet receiver 2100 has an outer surface defining a collet receiver contact surface 2110 configured as a curved lateral surface of a truncated right circular cone.

Each collet segment 2200 has a radially-internal collet segment contact surface 2210 comprising a first surface region 2211 and a second surface region 2212, with second surface region 2212 being axially contiguous with first surface region 2211. First and second surface regions 2211 and 2212 are configured for contact with collet receiver contact surface 2110, as described in greater detail later herein. Each collet segment 2200 further has a radially-external workpiece engagement surface 2220 suitably configured for gripping an inner surface of a tubular workpiece.

In FIG. 6A, internal collet 2000 is shown with workpiece engagement surfaces 2220 of collet segments 2200 in gripping engagement with an internal surface 2321 of a workpiece 2301 having an internal diameter corresponding to the minimum internal diameter that collet 2000 is designed to grip. For purposes of this disclosure, the position in which collet segments 2200 are shown in FIG. 6A—i.e., in which the axial length of the contact region between collet segment contact surfaces 2210 and collet receiver contact surface 2110 is greatest—is referred to as the retracted position.

Figure 6B:
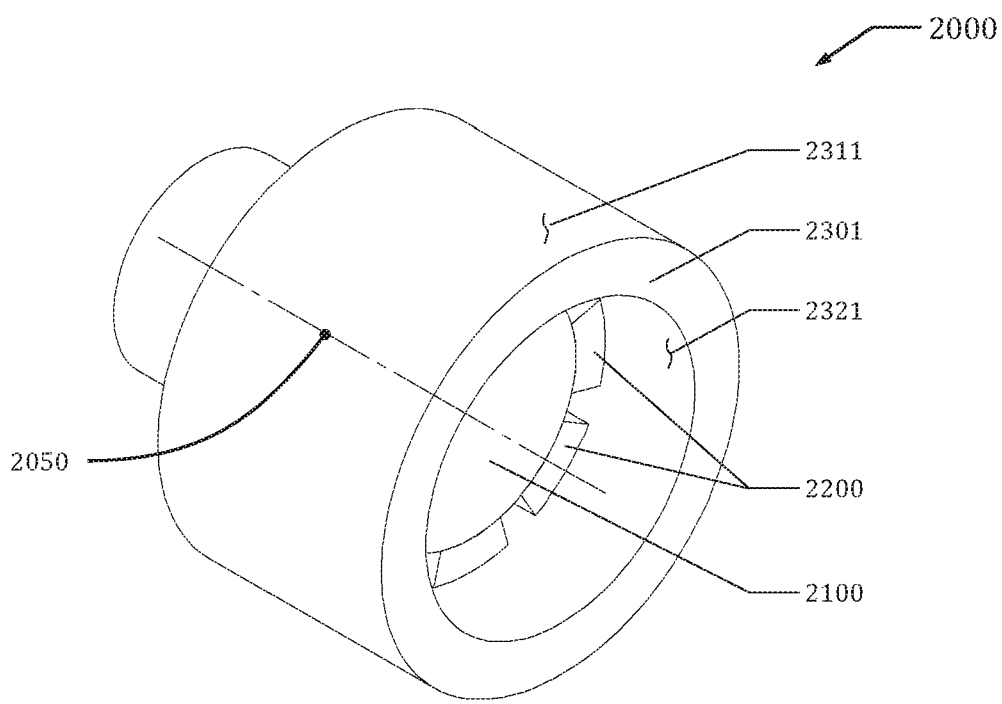
FIG. 6B is an isometric view of the internal collet and workpiece in FIG. 6A.

FIG. 6B is an isometric view of internal collet 2000 shown grippingly engaging workpiece 2301 as in FIG. 6A.

In FIG. 7A, internal collet 2000 is shown with workpiece engagement surfaces 2220 of collet segments 2200 in gripping engagement with an internal surface 2322 of a workpiece 2302 having the maximum internal diameter that collet 2000 is designed to grip. For purposes of this disclosure, the position in which collet segments 2200 are shown in FIG. 7A—i.e., in which the axial length of the contact region between collet segment contact surfaces 2210 and collet receiver contact surface 2110 is least—is referred to as the extended position.

Figure 7B:
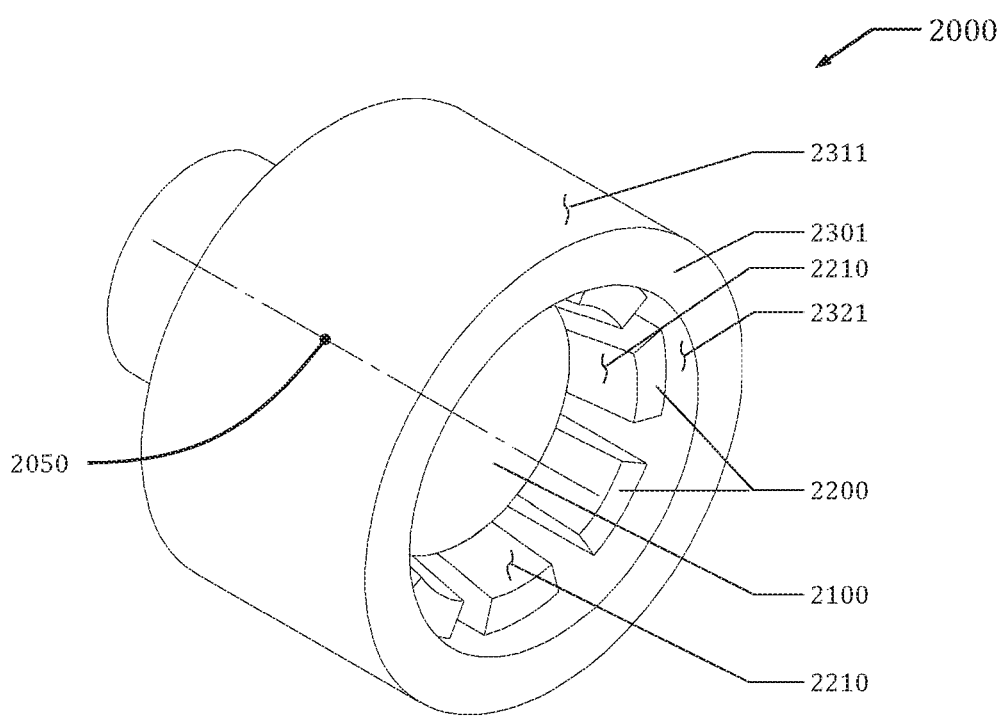
FIG. 7B is an isometric view of the internal collet and workpiece in FIG. 7A.

FIG. 7B is an isometric view of internal collet 2000 shown grippingly engaging workpiece 2302.

Figure 8A:
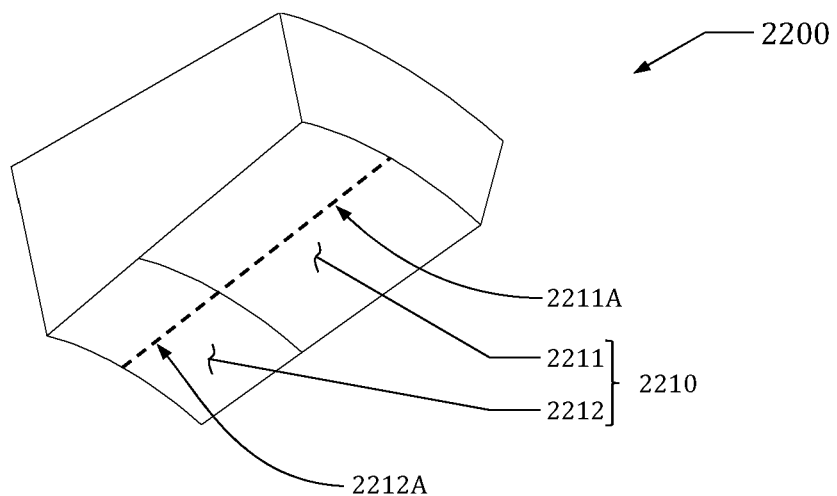
FIG. 8A is an isometric view of a collet segment of the internal collet shown in FIG. 6A.
Figure 8B:
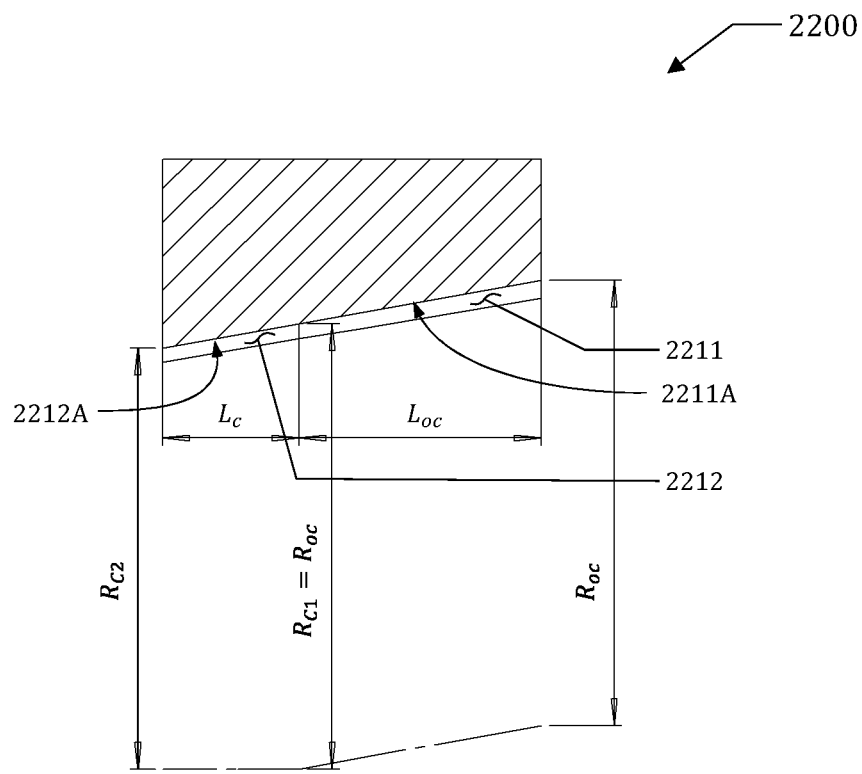
FIG. 8B is a longitudinal section view of the collet segment of FIG. 8A.

FIGS. 8A and 8B further illustrate a typical collet segment 2200 of internal collet 2000. As previously noted, each collet segment 2200 has a collet segment contact surface 2210 comprising first and second surface regions 2211 and 2212. First surface region 2211 has an axial length $L_{OC}$ and is configured as a portion of an OCC. Second surface region 2212 is configured as a portion of a curved lateral surface of a truncated right circular cone. Reference numbers 2211A and 2212A in FIGS. 8A and 8B indicate surficial lines that are coincident with, and which longitudinally bisect, first and second surface regions 2211 and 2212, respectively. As most clearly seen in FIG. 8A, surficial lines 2211A and 2212A in the illustrated embodiment are collinear (i.e., all points on lines 2211A and 2212A lie on the same straight line), and are parallel to the taper angle of conical collet receiver contact surface 2110 radially adjacent to second surficial line 2212A.

The axial length $L_C$ and radii $R_{C1}$ and $R_{C2}$ of second surface region 2212 may be selected such that the configuration of second surface region 2212 matches the configuration of collet receiver contact surface 2110 when collet segments 2200 are in their extended position. Thus selected, the taper angle of second surface region 2212 will be equal to the taper angle of collet receiver contact surface 2110.

Radius $R_{OC}$ of first surface region 2211 may be equal to radius $R_{C1}$ of second surface region 2212. The skew angle of the OCC that is used to define first surface region 2211 may be selected to be equal to the taper angle of the truncated right circular cone that is used to define collet receiver contact surface 2110.

Embodiment #3—Internally-Gripping Casing Running Tool

Figures 9A, 9B:
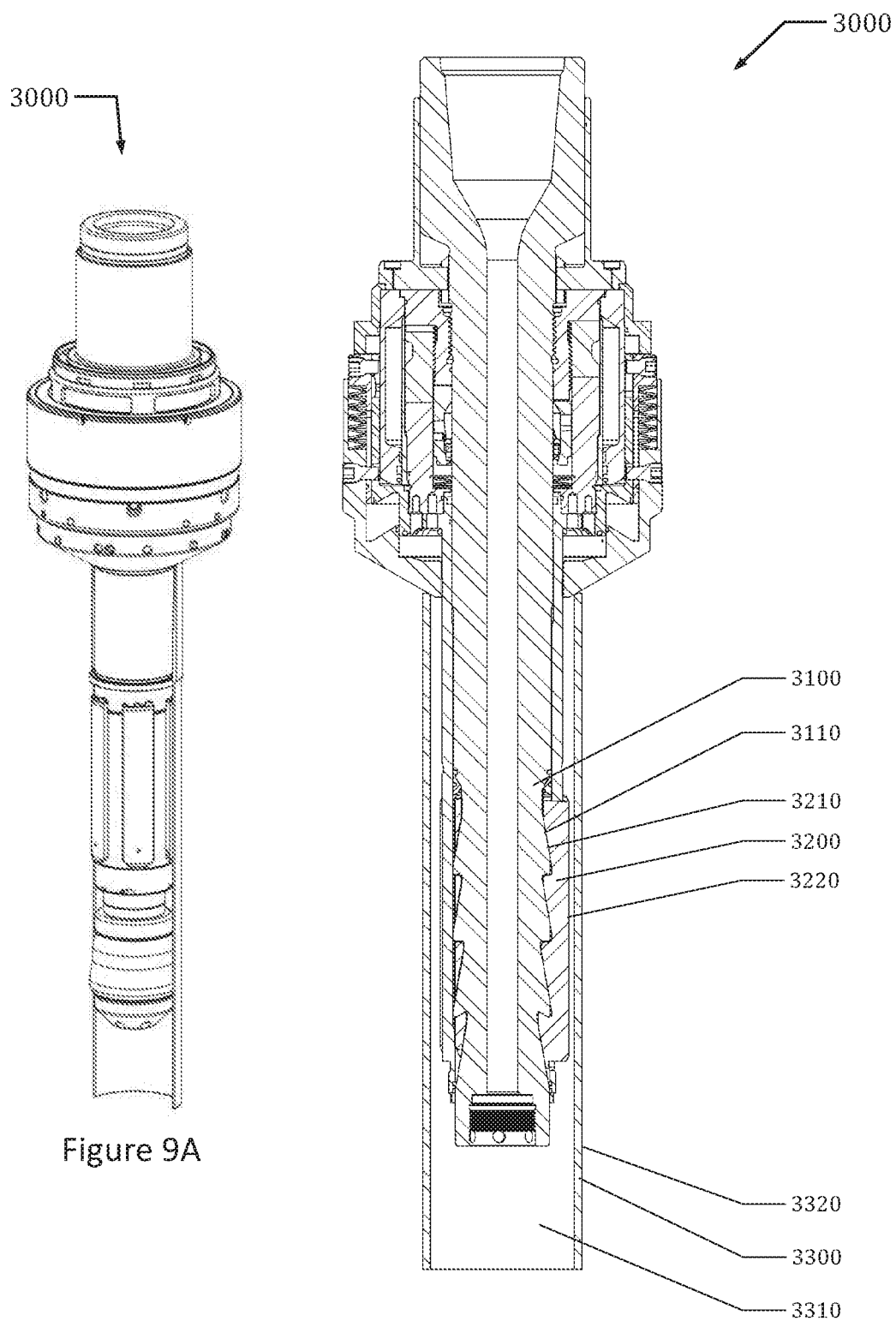
FIGS. 9A and 9B are, respectively, an isometric partial section and a longitudinal section through an internally-gripping tubular running tool generally as illustrated in FIGS. 8 and 9 in International Publication No. WO 2010/006441 (the contents of which are incorporated herein in their entirety, in jurisdictions so permitting), modified to incorporate features in accordance with the present disclosure, shown with the gripping assembly of the tubular running tool positioned within the bore of a tubular workpiece prior to initiation of internal gripping engagement therewith.

FIGS. 9A and 9B depict an internally-gripping casing running tool (or "CRT") 3000 similar to the prior art tubular running tool illustrated in FIGS. 8 and 9 in WO 2010/006441, but incorporating an internal collet-type mechanism in accordance with the present disclosure to grip a tubular casing workpiece 3300 having an inner surface 3310 and an outer surface 3320.

CRT 3000 incorporates a mandrel 3100 that acts as a collet receiver analogous to collet receiver 2100 of internal collet mechanism 2000 herein. The configuration of the outer surface 3110 of mandrel 3100 includes a plurality of truncated right circular cones.

Figure 10:
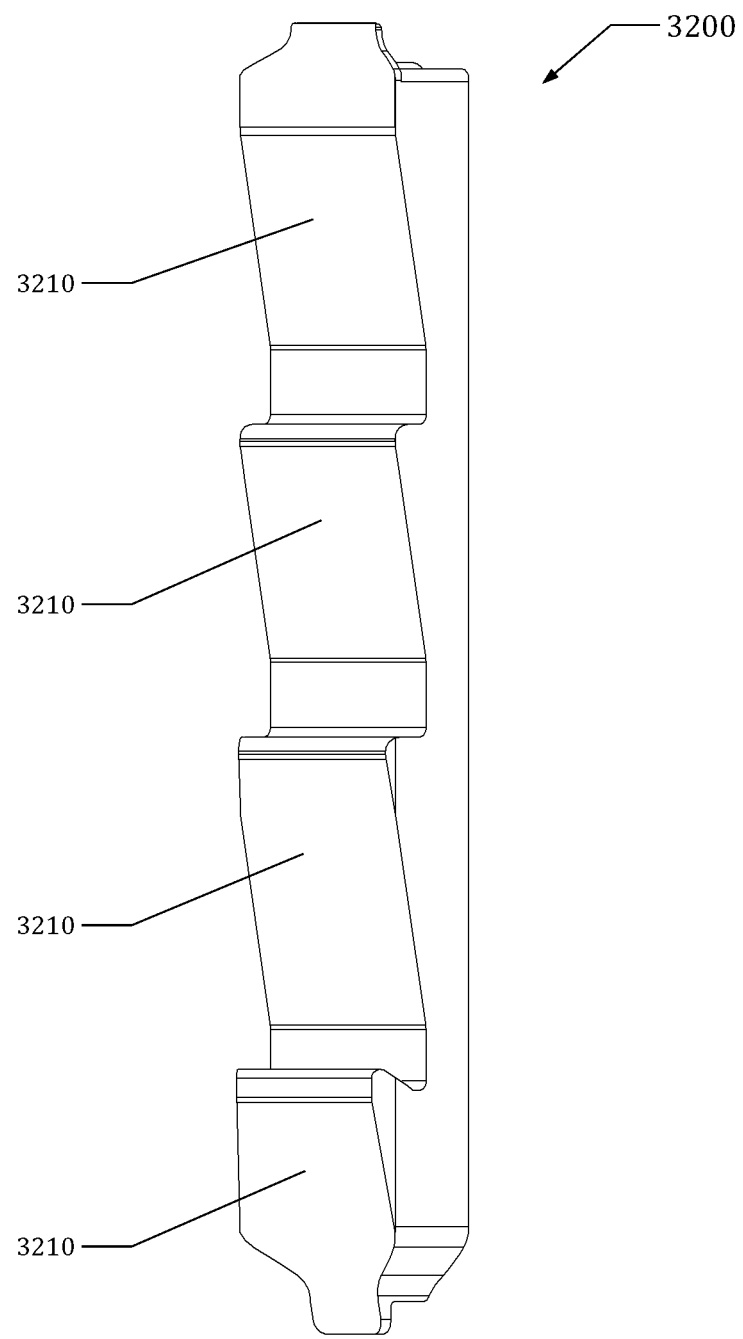
FIG. 10 is an isometric free-body view of one of the integrated slips of the tubular running tool shown in FIGS. 9A and 9B, incorporating features in accordance with the present disclosure.

CRT 3000 further incorporates integrated slips 3200 (alternatively referred to herein as slips elements) acting as collet segments. Integrated slips 3200 have an outer surface 3220 suitably configured to grip inner surface 3310 of casing 3300. As shown in FIGS. 9B and 10, integrated slips 3200 have a plurality of inner surface regions 3210 that contact outer surface 3110 of mandrel 3100. Inner surface regions 3210 are configured as OCC surfaces. The skew angle of the OCC surfaces that are used to define inner surface regions 3210 of integrated slips 3200 may be selected to equal the taper angle of the truncated right circular cones that are used to define outer surface 3110 of mandrel 3100.

Embodiment #4—Externally-Gripping Casing Running Tool

Figures 11A, 11B:
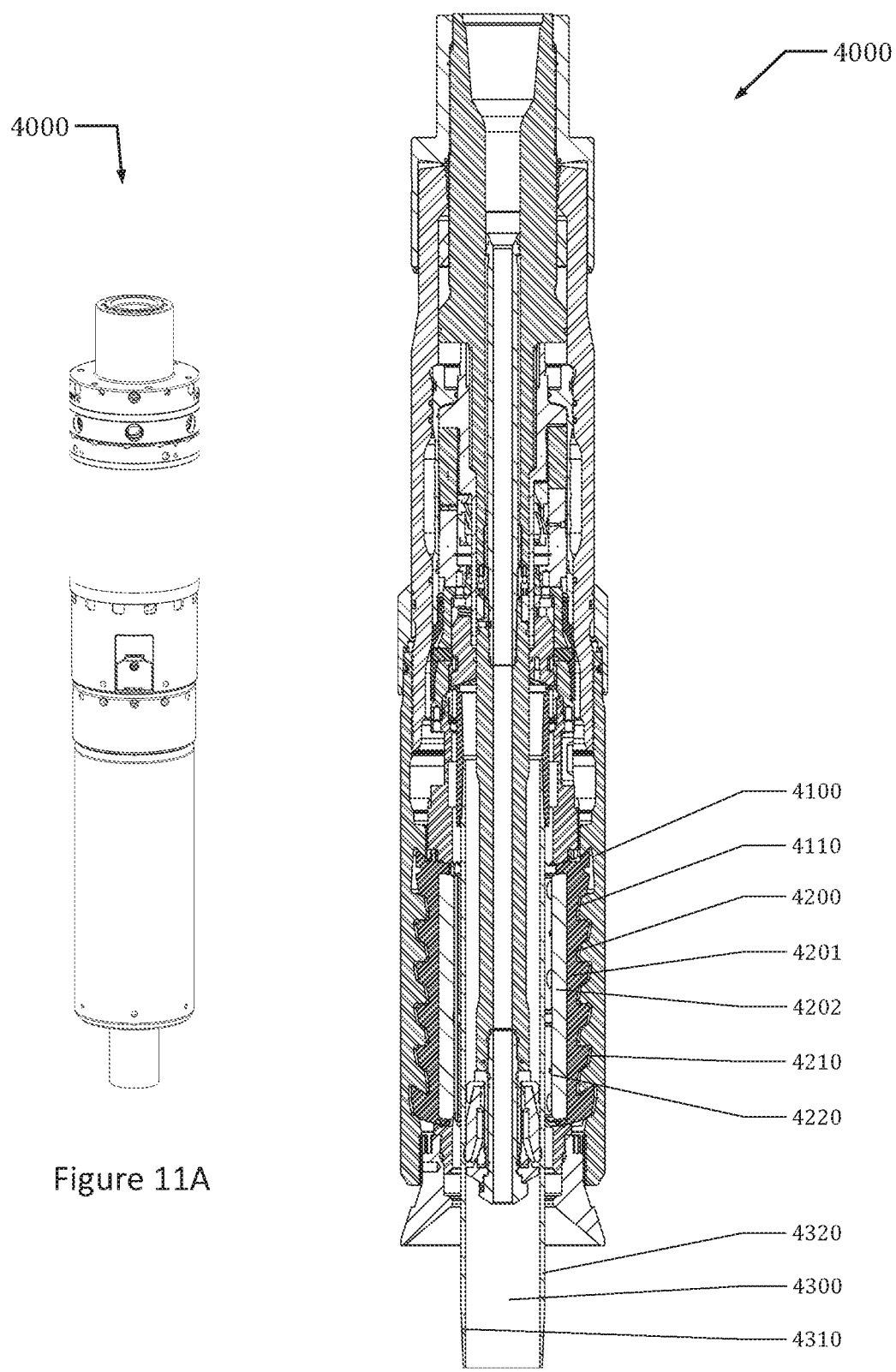
FIGS. 11A and 11B are, respectively, a perspective view and a longitudinal section through an externally-gripping tubular running tool generally as disclosed in U.S. Pat. Nos. 7,909,120 and 10,081,989 (the contents of both of which are incorporated herein in their entirety, in jurisdictions so permitting), modified to incorporate features in accordance with the present disclosure, with the gripping assembly of the tubular running tool disposed around an upper external surface of a tubular workpiece prior to initiation of external gripping engagement therewith.

FIGS. 11A and 11B depict an externally-gripping CRT 4000 similar to prior art tubular running tools disclosed in U.S. Pat. Nos. 7,909,120 and 10,081,989, but incorporating an external collet-type mechanism in accordance with the present disclosure to grip a tubular casing workpiece 4300 having an inner surface 4310 and an outer surface 4320.

CRT 4000 incorporates a mandrel 4100 that acts as a collet receiver analogous to collet receiver 1100 of external collet mechanism 1000 herein. Mandrel 4100 has an inner surface 4110 configured to define a plurality of truncated right circular cones.

Figure 12:
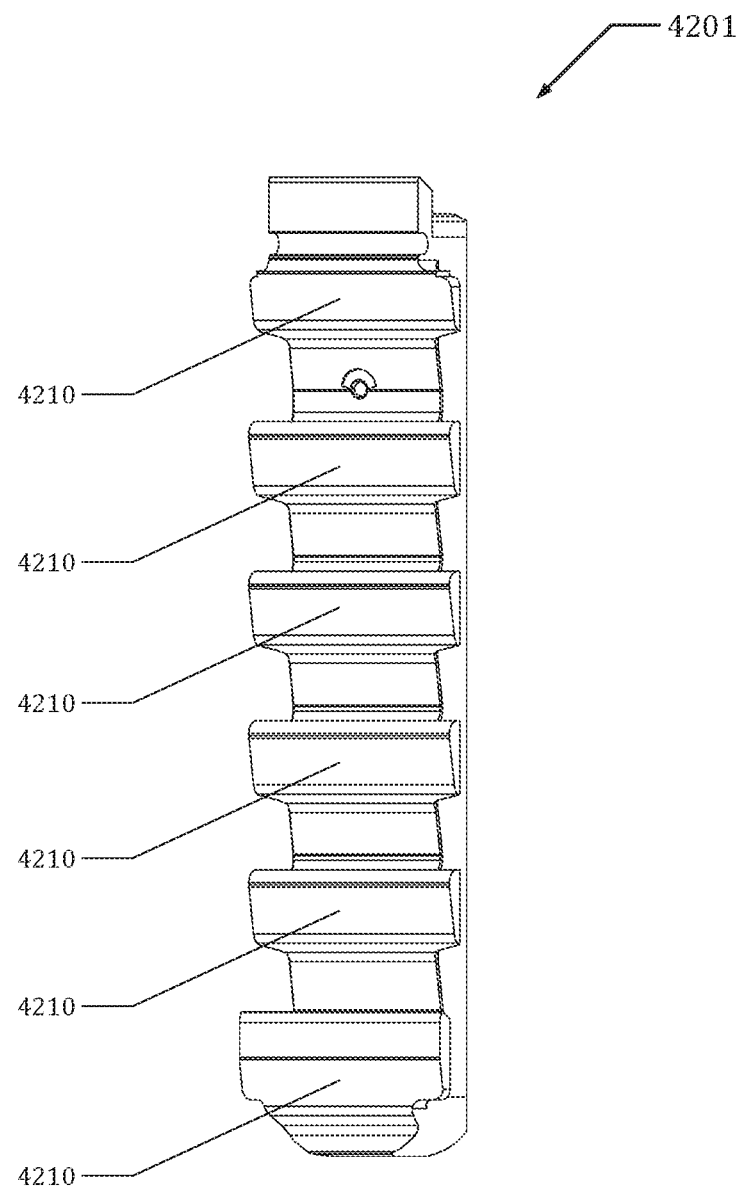
FIG. 12 is an isometric free-body view of one of the integrated slips of the tubular running tool shown in FIGS. 11A and 11B, incorporating features in accordance with the present disclosure.

CRT 4000 further incorporates slips assembly 4200 acting as collet segments, with each slips assembly 4200 including a jaw 4201 and a die 4202. An inner surface 4220 on each die 4202 of slips 4200 is suitably configured to grip outer surface 4320 of casing 4300. As shown in FIGS. 11B and 12, slips 4200 have a plurality of outer surface regions 4210 on jaws 4201 that contact inner surface 4110 of mandrel 4100. Outer surface regions 4210 are configured as OCC surfaces. The skew angle of the OCC surfaces that are used to define outer surface regions 4210 of slips 4200 may be selected to equal the taper angle of the truncated right circular cones that are used to define inner surface 4110 of mandrel 4100.

It will be readily appreciated by those skilled in the art that various modifications to embodiments in accordance with this disclosure may be devised without departing from the scope of the present teachings, such as but not limited to modifications which may use equivalent materials hereafter conceived or developed, a segmented collet with a different number of collet segments, or collets configured to engage with workpieces of different size or configuration. It is to be especially understood that the scope of this disclosure is not intended to be limited to described or illustrated embodiments, and that the substitution of a variant of a claimed or illustrated element or feature, without any substantial resultant change in functionality, will not constitute a departure from the scope of this disclosure.

In this patent document, any form of the word "comprise" is to be understood in its non-limiting sense to mean that any element or feature following such word is included, but elements or features not specifically mentioned are not excluded. A reference to an element or feature by the indefinite article "a" does not exclude the possibility that more than one such element or feature is present, unless the context clearly requires that there be one and only one such element or feature. Any use of any form of the terms "connect", "engage", "couple", "attach", or any other term describing an interaction between elements is not meant to limit the interaction to direct interaction between the subject elements, and may also include indirect interaction between the elements such as through secondary or intermediary structure.

Relational and conformational terms such as "perpendicular", "parallel", "cylindrical", and "equal" are not intended to denote or require absolute mathematical or geometrical precision. Accordingly, such terms are to be understood as denoting or requiring substantial precision only (e.g., "substantially perpendicular") unless the context clearly requires otherwise. Wherever used in this document, the terms "typical" and "typically" are to be interpreted in the sense of representative of common usage or practice, and are not to be understood as implying essentiality or invariability.

LIST OF ILLUSTRATED ELEMENTS

| Element Number | Description |
|---|---|
| 100 | external collet-type mechanism |
| 110 | collet receiver |
| 111 | surface of collet receiver that contacts the segmented collet ("collet receiver contact surface") |
| 120 | collet segment |
| 121 | surface of collet segment that contacts the collet receiver ("collet segment contact surface") |
| 200 | internal collet-type mechanism |
| 210 | collet receiver |
| 211 | surface of collet receiver that contacts the segmented collet ("collet receiver contact surface") |
| 220 | collet segment |
| 221 | surface of collet segment that contacts the collet receiver ("collet segment contact surface") |
| 1000 | external collet-type mechanism |
| 1050 | longitudinal axis of external collet-type mechanism |
| 1100 | collet receiver |
| 1110 | surface of collet receiver that contacts the segmented collet ("collet receiver contact surface") |
| 1200 | collet segment |
| 1210 | surface of collet segment that contacts the collet receiver ("collet segment contact surface") |
| 1211 | oblique circular cylinder region of surface 1210 |
| 1212 | right circular cone region of surface 1210 |
| 1220 | surface of segmented collet that contacts the workpiece ("workpiece engagement surface") |
| 1301 | workpiece with the minimum outer diameter that collet 1000 is designed to grip |
| 1311 | external surface of workpiece 1301 |
| 1321 | internal surface of workpiece 1301 |
| 1302 | workpiece with the maximum outer diameter that collet 1000 is designed to grip |
| 1312 | external surface of workpiece 1302 |
| 1322 | internal surface of workpiece 1302 |
| 2000 | internal collet-type mechanism |
| 2050 | longitudinal axis of internal collet-type mechanism |
| 2100 | collet receiver |
| 2110 | surface of collet receiver that contacts the segmented collet ("collet receiver contact surface") |
| 2211 | oblique circular cylinder region of surface 2210 |
| 2212 | right circular cone region of surface 2210 |
| 2200 | collet segment |
| 2210 | surface of collet segment that contacts the collet receiver ("collet segment contact surface") |
| 2220 | surface of segmented collet that contacts the workpiece ("workpiece engagement surface") |
| 2301 | workpiece with the minimum outer diameter that collet 2000 is designed to grip |
| 2311 | external surface of workpiece 2301 |
| 2321 | internal surface of workpiece 2301 |
| 2302 | workpiece with the maximum outer diameter that collet 2000 is designed to grip |
| 2312 | external surface of workpiece 2302 |
| 2322 | internal surface of workpiece 2302 |
| 3000 | internally-gripping casing running tool |
| 3100 | mandrel |
| 3110 | surface of mandrel that contacts the integrated slips |
| 3200 | integrated slip ("slips element") |

-continued

LIST OF ILLUSTRATED ELEMENTS

| Element Number | Description |
|---|---|
| 3210 | surface of integrated slip that contacts the mandrel |
| 3220 | surface of integrated slip that grips casing |
| 3300 | casing |
| 3310 | external surface of casing 3300 |
| 3320 | internal surface of casing 3300 |
| 4000 | externally-gripping casing running tool |
| 4100 | mandrel |
| 4110 | surface of mandrel that contacts the slips |
| 4200 | slips assembly |
| 4201 | jaw |
| 4202 | die |
| 4210 | surface of slips on jaw that contacts the mandrel |
| 4220 | surface of slips on die that grips casing |
| 4300 | casing |
| 4310 | external surface of casing 4300 |
| 4320 | internal surface of casing 4300 |

Embodiments in which an exclusive property or privilege is claimed are defined as follows:

1. A collet-type mechanism comprising:
(a) a collet receiver defining a collet receiver contact surface configured as a curved lateral surface of a truncated right circular cone, said collet receiver contact surface having a taper angle; and
(b) a segmented collet assembly comprising a plurality of collet segments, each defining:
a workpiece engagement surface configured for radially-compressive engagement with a workpiece to be gripped by the collet-type mechanism; and
a collet segment contact surface configured for at least partial contacting engagement with the collet receiver contact surface, wherein at least part of the collet segment contact surface defines a first surface region having a curvature which, as viewed in section transversely perpendicular to a longitudinal axis of the collet mechanism, is invariant along the axial length of the first surface region.

2. A collet-type mechanism as in claim 1 wherein the first surface region of each collet segment contact surface is configured as a portion of a curved lateral surface of a circular cylinder.

3. A collet-type mechanism as in claim 2 wherein the circular cylinder is an oblique circular cylinder.

4. A collet-type mechanism as in claim 2 wherein the circular cylinder is a right circular cylinder.

5. A collet-type mechanism as in claim 1 wherein each collet segment contact surface further comprises a second surface region, wherein said second surface region is axially contiguous with the first surface region, and wherein:
(a) the first surface region is configured as a portion of a curved lateral surface of a circular cylinder; and
(b) the second surface region is configured as a portion of a curved lateral surface of a truncated right circular cone.

6. A collet-type mechanism as in claim 5 wherein the circular cylinder is an oblique circular cylinder.

7. A collet-type mechanism as in claim 5 wherein the circular cylinder is a right circular cylinder.

8. A collet-type mechanism as in claim 5 wherein:
(a) the first surface region of the collet segment contact surface of each collet segment is longitudinally bisected by a first surficial line coincident with the first surface region;

(b) the second surface region of the collet segment contact surface of each collet segment is longitudinally bisected by a second surficial line coincident with the second surface region; and (c) the second surficial line is parallel to the taper angle of the collet receiver contact surface radially adjacent to the second surficial line.

9. A collet-type mechanism as in claim 8 wherein the first and second surficial lines are collinear.

10. A collet-type mechanism as in claim 1 wherein the collet-type mechanism is configured to grip an internal cylindrical surface of a workpiece.

11. A collet-type mechanism as in claim 1 wherein the collet-type mechanism is configured to grip an external cylindrical surface of a workpiece.

12. An internally-gripping tubular running tool comprising:

(a) an elongate mandrel defining an outer mandrel surface configured to define one or more mandrel contact surfaces each corresponding to a curved surface of a truncated circular cone, each said mandrel contact surface having a taper angle; and (b) a plurality of slips elements each having:
  an outer workpiece engagement surface configured for radially-compressive gripping engagement with an internal surface of a tubular workpiece; and
  one or more inner surface regions each configured for contacting engagement with a corresponding one of the one or more mandrel contact surfaces, with at least part of each inner surface region defining a first surface region having a curvature which, as viewed in section transversely perpendicular to a longitudinal axis of the internally-gripping tubular running tool, is invariant along the axial length of the first surface region.

13. An externally-gripping tubular running tool comprising:

(a) an elongate, generally cylindrical mandrel having an inner bore defining one or more mandrel contact surfaces each corresponding to a curved surface of a truncated circular cone, each said mandrel contact surface having a taper angle; and (b) a plurality of slips elements each having:
  an inner workpiece engagement surface configured for radially-compressive gripping engagement with an external surface of a tubular workpiece; and
  one or more outer contact surface regions each configured for contacting engagement with a corresponding one of the one or more mandrel contact surfaces, with at least part of each outer surface region defining a first surface region having a curvature which, as viewed in section transversely perpendicular to a longitudinal axis of the externally-gripping tubular running tool, is invariant along the axial length of the first surface region.

\* \* \* \* \*